(12) United States Patent
Miyatake et al.

(10) Patent No.: US 8,805,127 B2
(45) Date of Patent: Aug. 12, 2014

(54) OPTICAL WAVEGUIDE DEVICE, MANUFACTURING METHOD THEREFOR, OPTICAL MODULATOR, POLARIZATION MODE DISPERSION COMPENSATOR, AND OPTICAL SWITCH

(71) Applicant: Fujitsu Limited, Kawasaki (JP)

(72) Inventors: Tetsuya Miyatake, Kawasaki (JP); Takashi Shiraishi, Kawasaki (JP); Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/050,763

(22) Filed: Oct. 10, 2013

(65) Prior Publication Data
US 2014/0034602 A1  Feb. 6, 2014

Related U.S. Application Data

(62) Division of application No. 12/698,880, filed on Feb. 2, 2010, now Pat. No. 8,582,928.

(30) Foreign Application Priority Data

Feb. 3, 2009  (JP) ................ 2009-022498

(51) Int. Cl.
*G02F 1/035* (2006.01)
*G02B 6/13* (2006.01)
*G02F 1/03* (2006.01)
*G02F 1/225* (2006.01)

(52) U.S. Cl.
CPC . *G02B 6/13* (2013.01); *G02F 1/225* (2013.01); *G02F 1/035* (2013.01); *G02F 1/0316* (2013.01)
USPC ..................... 385/2; 385/3; 385/40

(58) Field of Classification Search
None
See application file for complete search history.

(56) References Cited

U.S. PATENT DOCUMENTS 5,263,102 A   11/1993  Hakogi
7,433,111 B2  10/2008  Sasaki et al.
7,447,389 B2  11/2008  Sugiyama

FOREIGN PATENT DOCUMENTS

JP    62-198824   9/1987
JP    08-086990   4/1996
JP    11-326853   11/1999

OTHER PUBLICATIONS

Amir, H. N. et al., "Ultrafast laser waveguide writing: lithium niobate and the role of circular polarization and picosecond pulse width", Optics Letters vol. 31, No. 20, Oct. 15, 2006, 2987-2989.
Henry, T. B. et al., "Femtosecond Laser Inscription of Low Insertion Loss Waveguides in Z-Cut Lithium Niobate", IEEE Photonics Technology Letters, vol. 19, No. 12, Jun. 15, 2007, 892-894.
Li, Gui et al., "Microstructure in Lithium Niobate by Use of Focused Femtosecond Laser Pulses", IEEE Photonics Technology Letters, vol. 16, No. 5, May 4, 2004, 1337-1339.
R., R. T. et al., "Optical waveguide fabrication in z-cut lithium niobate (LiNbO3) using femtosecond pulses in the low repetition rate regime", Applied Physics Letters 88, 111109 (2006) Mar. 15, 2006, 1-3.

(Continued)

*Primary Examiner* — Mike Stahl
(74) *Attorney, Agent, or Firm* — Fujitsu Patent Center

(57) ABSTRACT

An optical waveguide device includes: a substrate which has an electro-optical effect; an optical waveguide which is formed on the substrate and/or inside the substrate; and an in-substrate electrode which is formed of a metal and provided inside the substrate.

3 Claims, 12 Drawing Sheets

(56) References Cited

OTHER PUBLICATIONS

Yang, Liao et al., "Fabrication of microelectrodes deeply embedded in LiNbO3 using a femtosecond laser", Applied Surface Science 254 (2008) May 13, 2008, 7018-7021.

Y. Liao et al., "Electro-optic integration of embedded electrodes and waveguides in LiNb03 using a femtosecond laser". Optics Letters, 33:19:2281-2283, Oct. 2008.

Japanese Office Action mailed Jul. 31, 2012 for corresponding Japanese Application No. 2009-022498, with English-language translation.

"Japanese Office Action" dated Mar. 12, 2013, for corresponding Japanese Application No. 2009-022498 with partial English Translation.

USPTO, (STAHL) Notice of Allowance and Notice of Allowability, Jul. 15, 2013, in parent U.S. Appl. No. 12/698,880 [now allowed].

USPTO, (STAHL) Final Office Action, Apr. 4, 2013, in parent U.S. Appl. No. 12/698,880 [now allowed].

USPTO, (STAHL) Non-Final Office Action, Sep. 26, 2012, in parent U.S. Appl. No. 12/698,880 [now allowed].

USPTO, (STAHL) Restriction Requirement, Jun. 21, 2012, in parent U.S. Appl. No. 12/698,880 [now allowed].

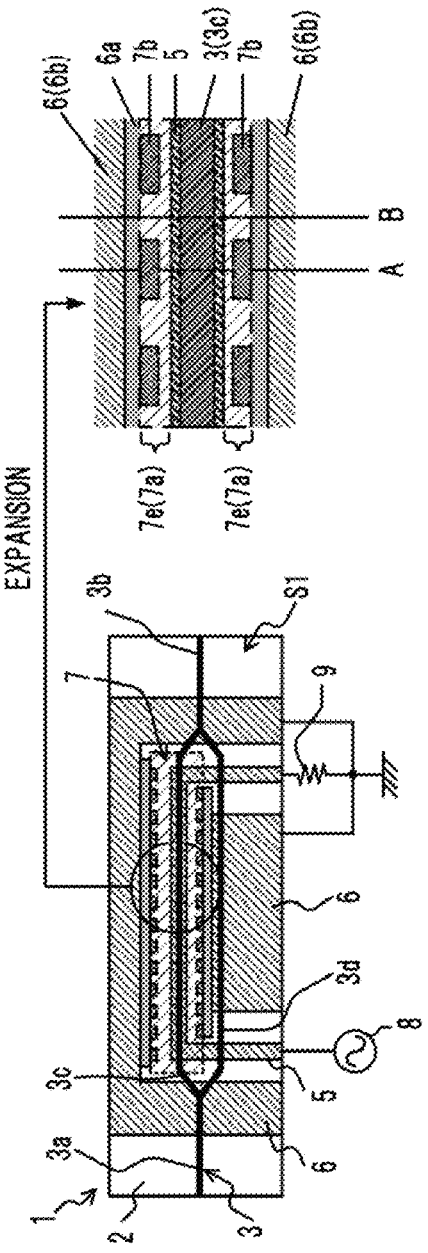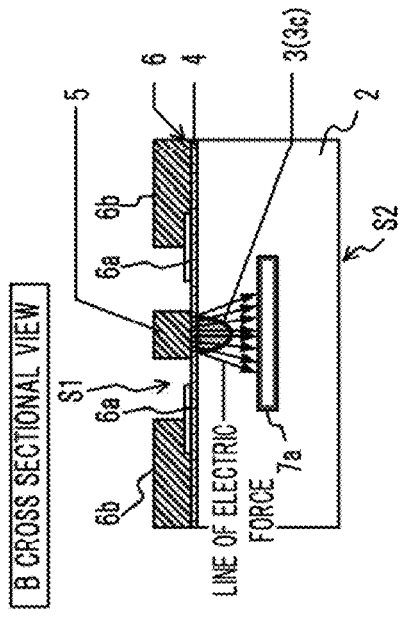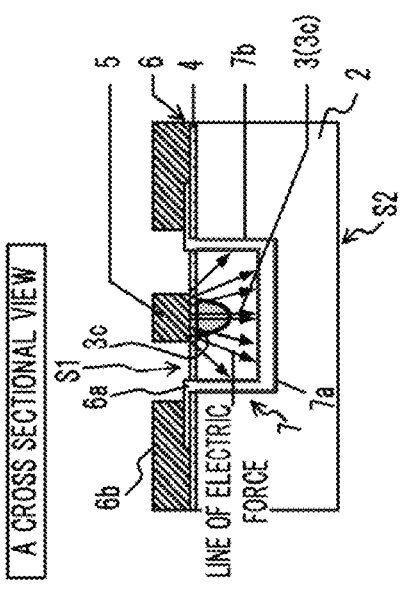

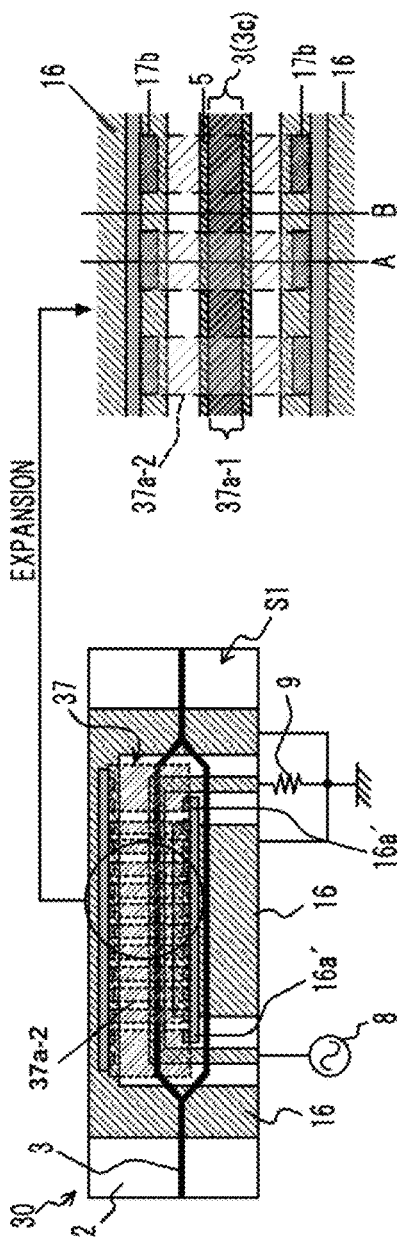
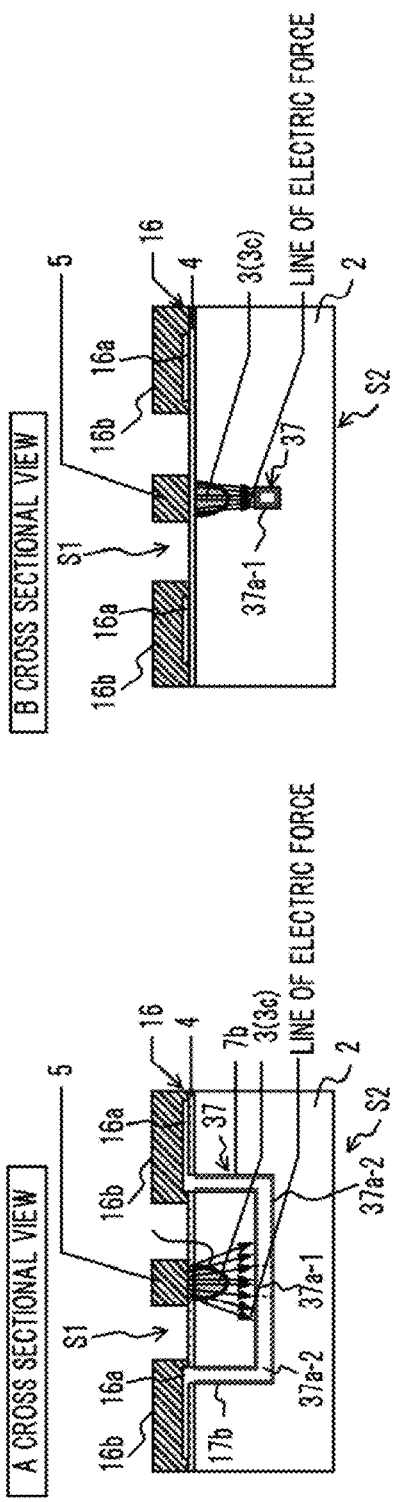

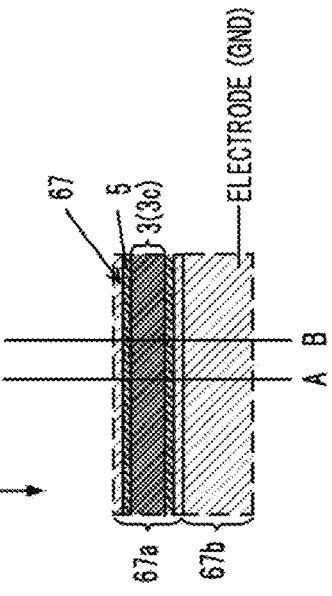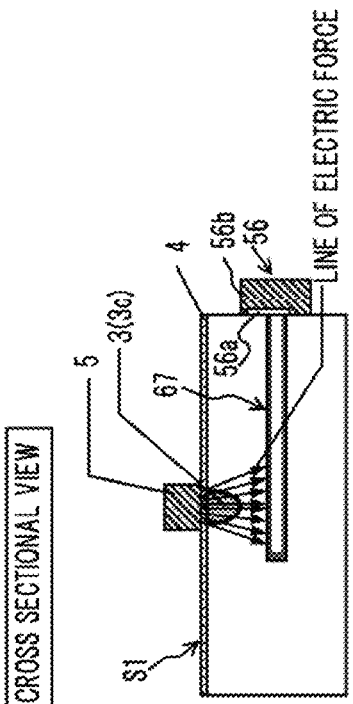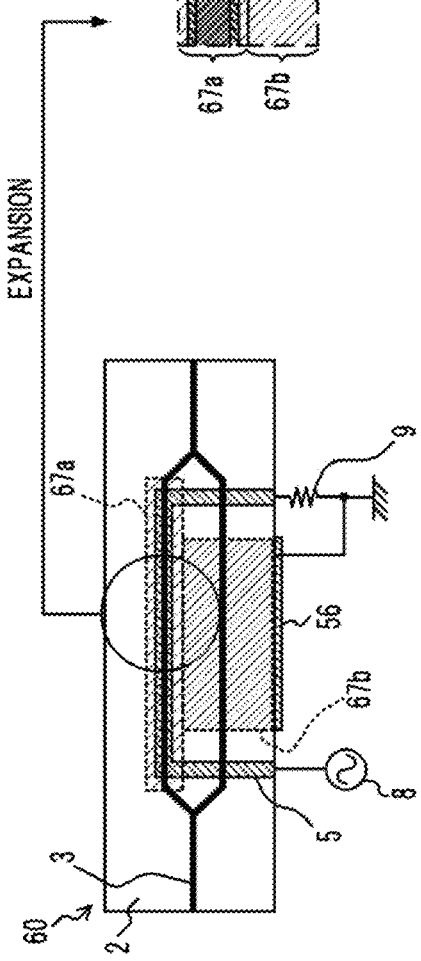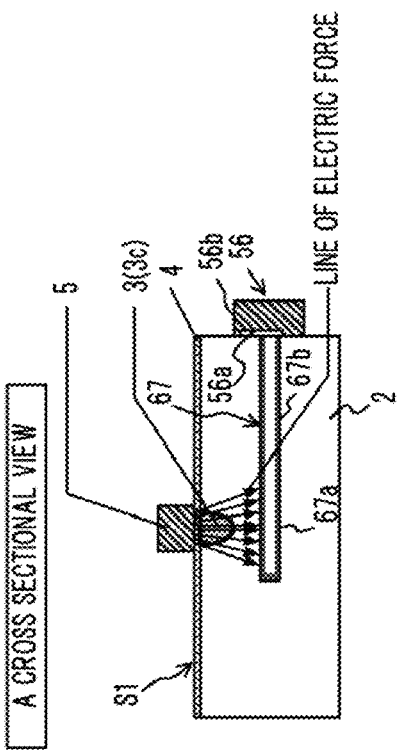

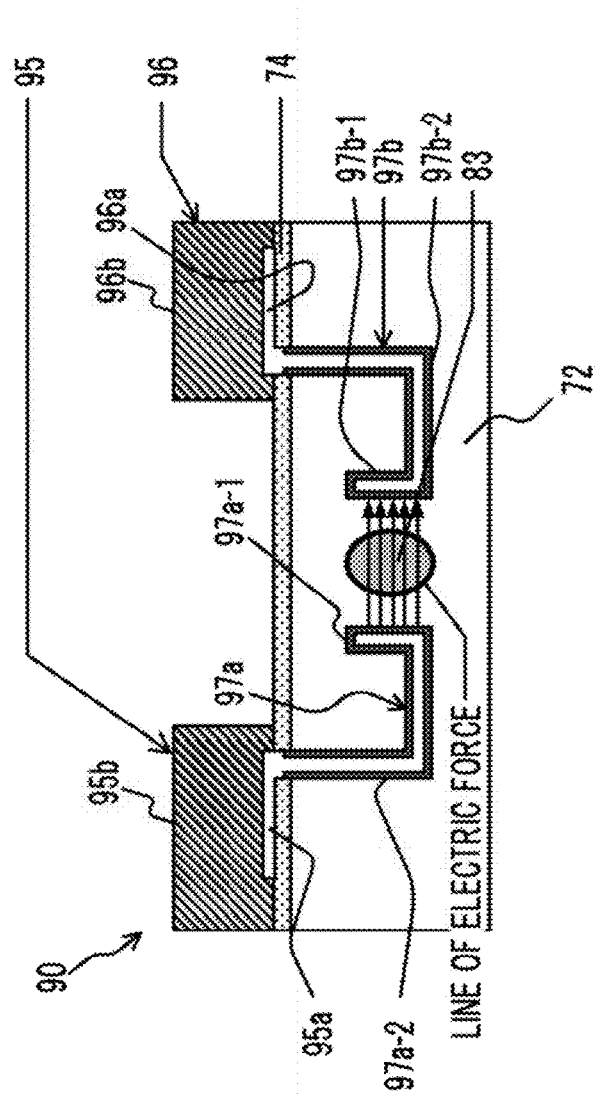

OPTICAL WAVEGUIDE DEVICE, MANUFACTURING METHOD THEREFOR, OPTICAL MODULATOR, POLARIZATION MODE DISPERSION COMPENSATOR, AND OPTICAL SWITCH

CROSS-REFERENCE TO RELATED APPLICATIONS

This application is a divisional of application Ser. No. 12/698,880, filed Feb. 2, 2010, which is based upon and claims the benefit of priority of the prior Japanese Patent Application No. 2009-022498, filed on Feb. 3, 2009, the entire contents of which are incorporated herein by reference.

FIELD

The embodiments discussed herein are related to an optical waveguide device, a manufacturing method therefor, an optical modulator, a polarization mode dispersion compensator, and an optical switch.

BACKGROUND

In recent years, miniaturization and power saving of transmission apparatuses for optical communications have been pursued. At present, a coplanar electrode structure, for example, is used in an optical waveguide device as a transmission apparatus. The coplanar electrode structure may control a refractive index based on an electric field supplied to the optical waveguide. However, a driving voltage is generally increased in order to provide control of the refractive index.

In addition to the coplanar electrode structure, a structure for concentrating lines of electric force on the optical waveguide by forming an electrode right under the optical waveguide has been proposed in Japanese Laid-Open Patent Publication No. 11-326853, for example.

According to a technique described in Japanese Laid-Open Patent Publication No. 11-326853, to epitaxially grow a lithium niobate (LiNbO3:LN) thin-film, ZnO (a conductive crystal material) is employed as an electrode material formed directly under the waveguide. The conductive crystal material of the electrode matches a lattice constant of an LN crystal. However, a conductive crystal material such as ZnO has a resistance value that is expected to be higher than that of a metal in a low frequency area. Further, the resistance value of the conductive crystal material is expected to be even higher than that of the metal in a high frequency area.

Accordingly, using a conductive crystal material such as ZnO as an electrode driving at high-frequency voltage may cause large losses affecting the effectiveness of the electrode, which results in an increase of a related driving voltage. In general, the resistance value of the metal is relatively low compared to that of the conductive crystal material. However, in a technique described in Japanese Laid-Open Patent Publication No. 11-326853, the metal may not be used in place of the conductive crystal material at least because of the issue of matching the lattice constant.

SUMMARY

According to an aspect of the invention, an optical waveguide device includes: a substrate which has an electro-optical effect; an optical waveguide which is formed on the substrate and/or inside the substrate; and an in-substrate electrode which is formed of a metal and provided inside the substrate.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 1A illustrates a first embodiment;
FIG. 1B illustrates a first embodiment;
FIG. 1C illustrates a first embodiment;
FIG. 1D illustrates a first embodiment;
FIG. 6A illustrates a fourth embodiment;
FIG. 6B illustrates a fourth embodiment;
FIG. 6C illustrates a fourth embodiment;
FIG. 6D illustrates a fourth embodiment;
FIG. 9A illustrates a seventh embodiment;
FIG. 9B illustrates a seventh embodiment;
FIG. 9C illustrates a seventh embodiment;
FIG. 9D illustrates a seventh embodiment;
FIG. 12 illustrates a tenth embodiment.

DETAILED DESCRIPTION OF THE EMBODIMENTS

Figure 2A:
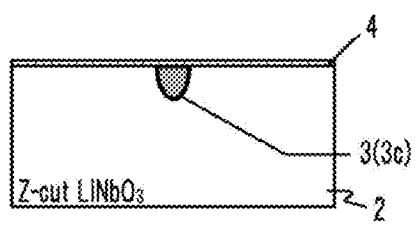
FIG. 2A illustrates an example of an intermediate step of a manufacturing process of an optical waveguide device illustrated in FIG. 1.

With reference to the figures, embodiments will be described below. However, the embodiments described below are examples. Various modifications and techniques that are not described below may be applied. That is, the described embodiments may be modified and performed without departing from the scope of the invention.

FIGS. 1A, 1B, 1C, and 1D are diagrams illustrating a first embodiment. In FIGS. 1A, 1B, 1C, and 1D, numeral 1 indicates an optical waveguide device. FIG. 1A is a top view of the optical waveguide device 1. FIG. 1B is an expanded view of a portion of FIG. 1A. FIG. 1C is an A cross sectional view of FIG. 1B. FIG. 1D is a B cross sectional view of FIG. 1B.

The optical waveguide device 1 includes a substrate 2, an optical waveguide 3, electrodes 5 and 6, and an in-substrate electrode 7. Numeral 4 illustrated in FIG. 1C and FIG. 1D indicates a buffer layer between the substrate 2 and the electrodes 5 and 6. Here, the substrate 2 has an electro-optical effect and changes the refractive index of the optical waveguide 3 based on an electric field (a line of electric force in FIGS. 1C and 1D) applied in a direction approximately and/or substantially vertical (perpendicular) to a first surface S1 of the substrate 2 or a second surface S2. The second surface S2 in FIGS. 1C and 1D is a back surface of the substrate S2. For example, a Z-cut lithium niobate substrate may be used. A substrate formed of a single electro-optic crystal may also be used.

The optical waveguide 3 is formed in and/or on the first surface S1 of the substrate 2. As illustrated in FIG. 1A, the optical waveguide 3 includes an incident waveguide unit 3a and a projection waveguide unit 3b and may be formed in a Mach-Zehnder interferometer having branching waveguide units 3c and 3d between the incident waveguide unit 3a and the projection waveguide unit 3b. The pattern of the optical waveguide 3 is an example. Any other pattern may be used to form the optical waveguide 3. Moreover, the optical waveguide 3 may be formed inside the substrate 2.

Furthermore, the electrodes 5 and 6 may be formed to operate to correspond to the branching waveguide units 3c and 3d. As illustrated in FIGS. 1A, 1B, 1C, and 1D, the electrode 5 is formed on the top of the branching waveguide unit 3c as a traveling wave electrode used to apply an electric field to the branching waveguide unit 3c. A high-frequency electrical signal according to transmission data is supplied from one end of the electrode 5 by a signal source 8, and the other end is terminated by a termination resistor 9.

The electrode 6 is a ground electrode formed at a distance from the electrode 5 and includes a first electrode unit 6a, which is used to be electrically connected to the in-substrate electrode 7 described below, and includes a second electrode unit 6b that is connected to the first electrode unit 6a. The first electrode unit 6a illustrated in FIGS. 1B, 1C, and 1D indicates an area formed to be thinner than the second electrode unit 6b of the electrode 6. According to the present embodiment, the first electrode unit 6a extends from the second electrode unit 6b in a direction towards the electrode 5.

Furthermore, the in-substrate electrode 7 is formed of metal such as copper. As illustrated in FIG. 2A through FIG. 2F, a cavity is formed inside the substrate 2 that is to be the in-substrate electrode 7. The formed cavity is filled with a metallic material. In this case, the in-substrate electrode 7 includes a first internal electrode unit 7a and a via part 7b.

The first internal electrode unit 7a is formed between the branching waveguide unit 3c and the second surface S2 of the substrate 2 and includes a surface corresponding to a surface to which a signal electrode 5 applies the electric field (the line of electric force) in the direction approximately and/or substantially vertical (perpendicular) to the first surface S1. That is, as illustrated in FIG. 1C and FIG. 1D, the first internal electrode unit 7a may be formed to have a surface that is substantially parallel to the first surface S1.

As illustrated in FIG. 1B through FIG. 1D, the first internal electrode unit 7a is formed to range from an upstream side to a downstream side in a light propagation direction in the branching waveguide unit 3c and is wider than the width of the signal electrode 5. In FIG. 1B, the area of the first internal electrode unit 7a, which is wider than the width of the signal electrode 5, is illustrated as an area 7e.

The via part (conduction via) 7b is an example of a first connection unit that electrically connects the first internal electrode unit 7a and a ground electrode 6. As illustrated in FIG. 1C, the via part 7b is formed along both edges of the width direction of the first internal electrode unit 7a. According to the present embodiment, a plurality of via parts 7b are formed at intervals along the above-described area 7e formed to be extended in the first internal electrode unit 7a. The via parts 7b provide a conductive connection between the first internal electrode unit 7a and the first electrode unit 6a composing the ground electrode 6, for example.

According to the present embodiment, the areas 7e are formed on the both sides of the signal electrode 5, and the via parts 7b are formed at intervals along the edges of the areas 7e on the both sides of the signal electrode 5. The A cross sectional view illustrated in FIG. 1C includes a cross sectional view of the via part 7. The B cross sectional view illustrated in FIG. 1D does not include the cross sectional view of the via part 7b because the B cross sectional view is a cross section view of a portion between the via parts 7b.

Next, an example of a manufacturing process of the optical waveguide device 1 illustrated in FIG. 1 will be described by using FIG. 2A through FIG. 2F. As illustrated in FIG. 2A, on the first surface S1 of the LN substrate 2, the optical waveguide 3 is formed by a titanium (Ti) diffusion method or the like, and then a buffer layer 4 is formed.

Next, a cavity is formed in a part where the in-substrate electrode 7 is required to be formed in the substrate 2. For example, condensing and radiating of an ultrashort pulse laser is performed onto a part where the in-substrate electrode 7 is to be formed. Then selective etching is performed after the part is amorphized.

Figure 2B:
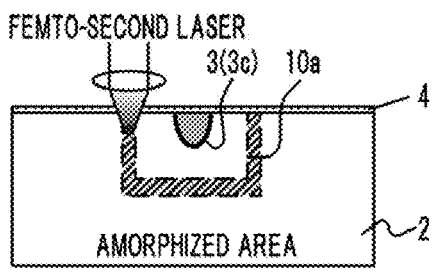
FIG. 2B illustrates an example of an intermediate step of a manufacturing process of an optical waveguide device illustrated in FIG. 1.

Specifically, a femto-second laser as an example of the ultrashort pulse laser is radiated onto a part where the first internal electrode unit 7a is to be formed under the branching waveguide unit 3c viewed from the first surface S1 and onto a part where the via part 7b is required to be formed, and then the substrate 2 is amorphized (see FIG. 2B).

The femto-second laser is radiated onto the substrate 2, so that a part of the substrate 2 in which focus positions of the femto-second laser are connected is amorphized. Accordingly, for example, a specified area in the substrate 2 may be amorphized by moving the substrate 2 which is fixed to a base in such a way that a track of the focus positions of the femto-second laser follows the above-described part where the in-substrate electrode 7 is required to be formed.

Figure 2C:
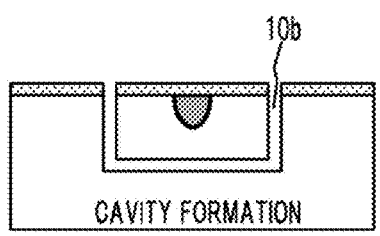
FIG. 2C illustrates an example of an intermediate of a manufacturing process of an optical waveguide device illustrated in FIG. 1.

Next, as illustrated in FIG. 2C, a part 10a irradiated with the above-described femto-second laser is radiated and is wet-etched by acid or potassium hydroxide (KOH), for example. The amorphized area corresponding to the part where the via part 7b is formed operates as an approach path through which etchant penetrates into a forming unit of the first internal electrode unit 7a. This makes it possible to form a cavity in the part where the first internal electrode unit 7a is formed and in the part where the via part 7b is formed. Numeral 10b as illustrated in FIG. 2C indicates a cavity formed by the above-described process for forming a cavity.

Figure 2D:
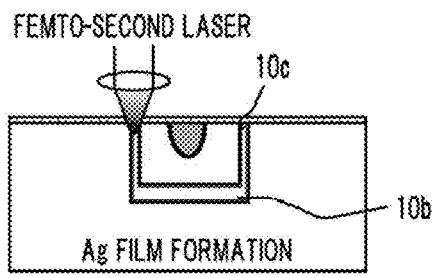
FIG. 2D illustrates an example of an intermediate of a manufacturing process of an optical waveguide device illustrated in FIG. 1.

After the cavity 10b is formed as described above, the cavity 10b is filled with metal. For example, as illustrated in FIG. 2D, the cavity 10b formed as described above is filled with metallic salt (for example, $AgNO_3$), and the femto-second laser is radiated onto an inner wall of the cavity 10b. This makes it possible to precipitate the metal (for example, Ag) on the inner wall of the cavity 10b. The precipitated metal may be formed like a thin film (see a metal thin film 10c illustrated in FIG. 2D).

Figure 2E:
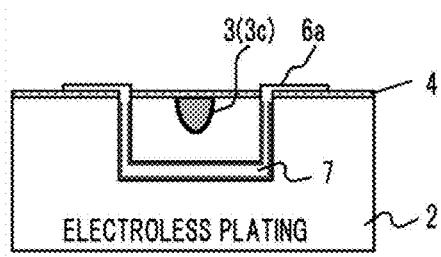
FIG. 2E illustrates an example of an intermediate of a manufacturing process of an optical waveguide device illustrated in FIG. 1.

As illustrated in FIG. 2E, electroless plating is performed on the cavity 10b with the metal thin film 10c, and then metal (for example, Cu) is embedded in the cavity 10b. In this manner, the in-substrate electrode 7 is formed. In addition to the above-described formation area of the in-substrate electrode 7, the first electrode unit 6a composing a part of the ground electrode 6 formed on the top of the substrate 2 may be formed in the process for filling metal by the electroless plating.

Figure 2F:
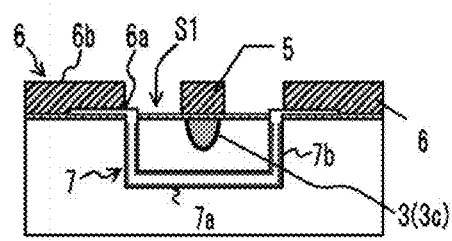
FIG. 2F illustrates an example of an intermediate of a manufacturing process of an optical waveguide device illustrated in FIG. 1.

Furthermore, after the in-substrate electrode 7 is formed as described above, the signal electrode 5 and the ground electrode 6 are formed on the first surface S1 as illustrated in FIG. 2F. At this time, to set application voltage to the first internal electrode unit 7a from the first surface S1 side, the first internal electrode unit 7a is connected to the ground electrode 6 via the via part 7b. Specifically, an electrode 6b, which is to be electrically connected to the first electrode unit 6a that is formed when the via part 7b is formed, is formed.

In the above-described process for forming the cavity 10b, the cavity part corresponding to a formation part of the via part 7b is formed in the direction vertical (perpendicular) to the first surface S1 and may also be formed in a direction oblique to the substrate 2. Moreover, to form the cavity 10b, instead of conducting the above-described process, an ablation may be performed on the part where the in-substrate electrode 7 is to be formed. Specifically, after the above-described process in FIG. 2A, the cavity 10b illustrated in FIG. 2C may be formed by using the ablation of the substrate 2 by radiating the femto-second laser instead of conducting the above-described process.

As described above, the optical waveguide device 1 may change the refractive index of the branching waveguide unit 3c according to the driving voltage that is applied to the signal electrode 5. This makes it possible to modulate a light that is input from the incident waveguide unit 3a of the optical waveguide 3 composing the Mach-Zehnder interferometer, and the light is output as a modulated light from the projection waveguide unit 3b. In other words, the optical waveguide device 1 may be used as an optical modulator.

Here, the optical waveguide device 1 according to the present embodiment has a surface where the first internal electrode unit 7a and the signal electrode 5 electrically connected to the ground electrode 6 and the signal electrode 5 face each other. The branching waveguide unit 3c is interposed between the first internal electrode unit 7a and the signal electrode 5.

Compared to the coplanar electrode structure, among the lines of electric force generated by a potential difference given to the signal electrode 5 and the first internal electrode unit 7a, the lines of electric force going through the branching waveguide unit 3c in the direction substantially vertical (perpendicular) to the first surface S1 may be concentrated. In other words, the number of the lines of electric force going through in the direction substantially vertical (perpendicular) to the first surface S1 may be increased. This may increase the application efficiency of the driving voltage. By increasing the application efficiency of the driving voltage, the power that is required to generate the desired change in the refractive index may be reduced.

Compared to the case of using a conductive crystal material to form an electrode inside the substrate, the power saving may be achieved as described below because the first internal electrode unit 7a is formed of metal. That is, in the optical waveguide device 1, a conductor loss by the electrode (5 or 7a) may be expressed by the following formula.

$$\alpha_c \propto Rs \propto \frac{1}{\sqrt{\pi f \mu \sigma}}$$

Figure 3:
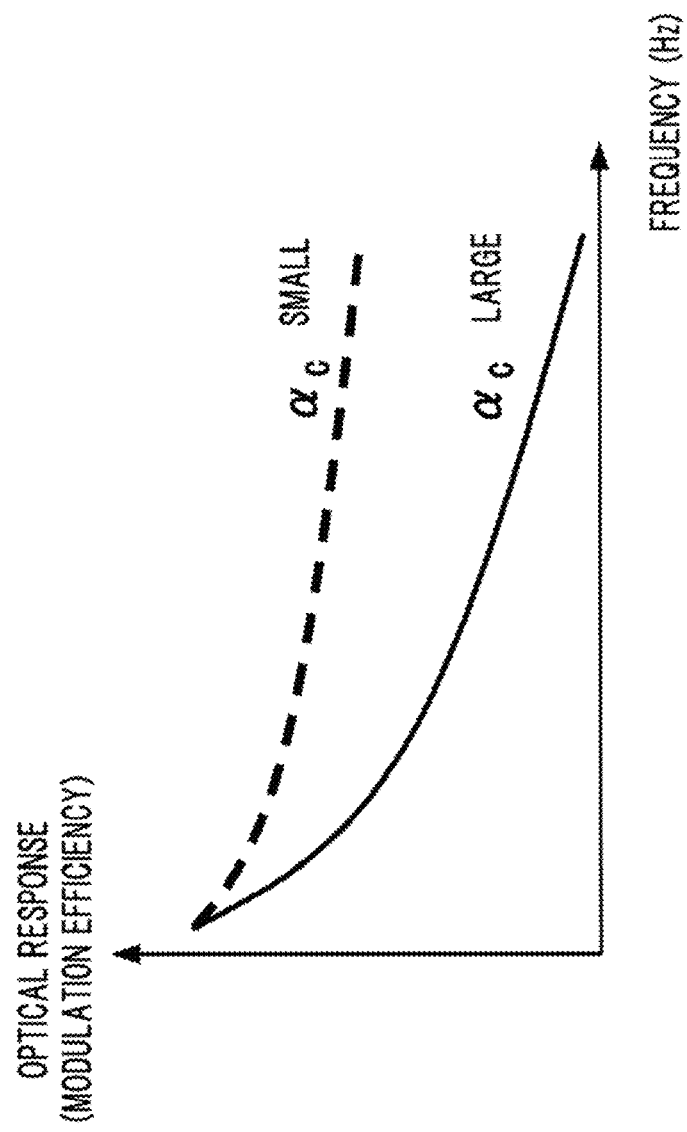
FIG. 3 illustrates a diagram of a relation between an optical response (modulation efficiency) and a frequency in the optical waveguide device.

In this case, f indicates a frequency of the voltage that is applied to the signal electrode 5, σ indicates an electric conductivity of the electrode, and μ indicates a permeability. FIG. 3 illustrates a diagram of a relation of an optical response (modulation efficiency) and a frequency in the optical waveguide device 1. That is, as illustrated in FIG. 3, the smaller the conductor loss expressed by the above-described formula is, the larger the optical response is. Thus, the modulation efficiency is increased. Since this tendency is remarkable in a high frequency band and is useful in a device such as, for example, an optical modulator, a polarization mode dispersion compensator, or an optical switch used for optical communication.

Therefore, according to the present embodiment, when the first internal electrode unit 7a is formed of metal, the electric conductivity of the electrode is higher than that of an electrode formed of a conductive crystal material. Thus, the conductor loss may be reduced according to the above-described formula. When the conductor loss is reduced, the modulation efficiency is increased, which may reduce the driving voltage.

As described above, according to the first embodiment, compared to the technique for using a conductive crystal material to form an electrode, the power saving may be achieved by reducing the driving voltage in the first embodiment.

Figure 4A:
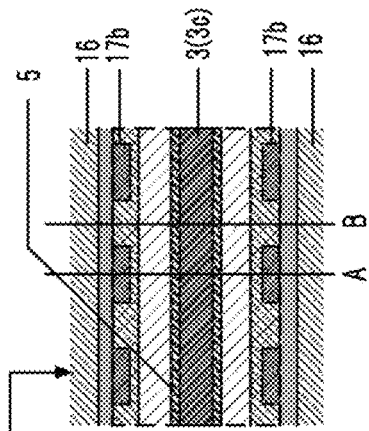
FIG. 4A illustrates a second embodiment.
Figure 4B:
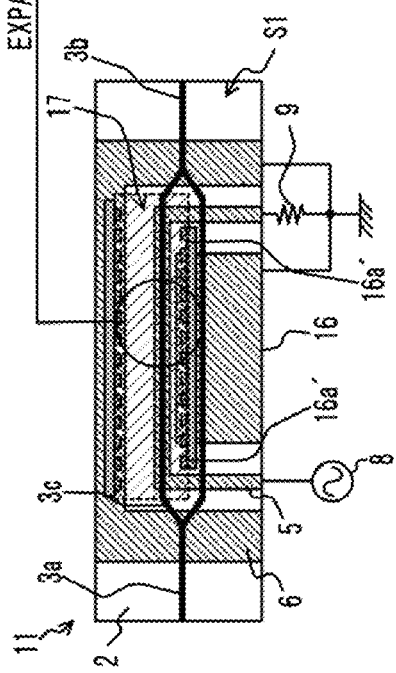
FIG. 4B illustrates a second embodiment.
Figure 4C:
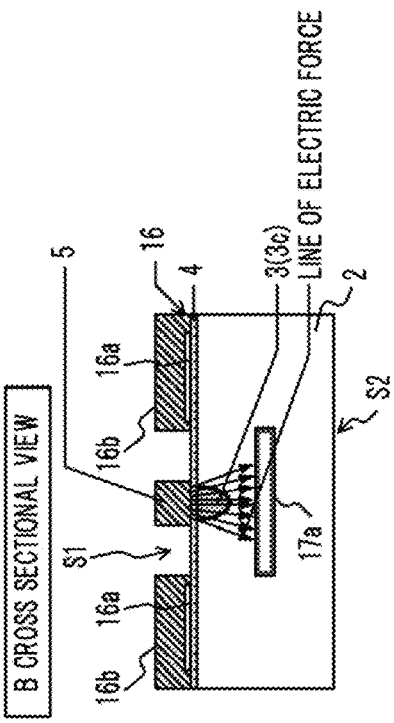
FIG. 4C illustrates a second embodiment.
Figure 4D:
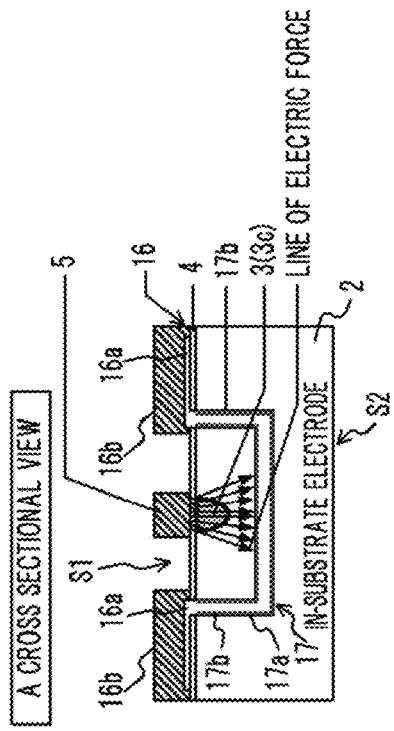
FIG. 4D illustrates a second embodiment.

FIG. 4A through FIG. 4D are diagrams illustrating a second embodiment. In FIG. 4A through FIG. 4D, numeral 11 indicates an optical waveguide device. FIG. 4A is a top view of the optical waveguide device 11. FIG. 4B is an expanded view of a portion of FIG. 4A. FIG. 4C is an A cross sectional view of FIG. 4B. FIG. 4D is a B cross sectional view of FIG. 4B.

The optical waveguide device 11 illustrated in FIG. 4A through FIG. 4D is similar to the optical waveguide device 1 according to the first embodiment (see FIG. 1A through FIG. 1D) in that the optical waveguide device may be used as an optical modulator. However, a ground electrode 16 and an in-substrate electrode 17 of the optical waveguide device 11 shown in FIG. 4A through 4D are different. The same numerals in the FIG. 1A through FIG. 1D indicate substantially similar parts.

Here, a ground electrode 16 includes a second electrode unit 16b and a first electrode unit 16a that may be formed when a via part 17b described below is formed. The first electrode unit 16a except a part thereof is covered with the second electrode unit 16b. Numeral 16a' in FIG. 4A indicates a part where the first electrode unit 16a is not covered with the second electrode unit 16b. The pattern of the ground electrode 16 is changeable accordingly.

The in-substrate electrode 17 includes a first internal electrode unit 17a having a pattern different from that of the in-substrate electrode 7 according to the first embodiment, and includes the via part 17b. The width of the first internal electrode unit 17a is larger than in the first embodiment. For example, as illustrated in FIG. 4C and FIG. 4D, the width of the first internal electrode 17a is formed to be longer than the distance between the ground electrodes 16 between which the signal electrode 5 is interposed. The via part 17b as an example of the first connection unit is the same as the via part 7b in that a plurality of via parts 17b are formed along the both edges of the width direction of the first internal electrode unit 17a, so that the upper ground electrode 16 and the first internal electrode unit 17a are connective.

However, the distance between the via parts 17b facing each other and between which the branching waveguide unit 3c is interposed corresponds to the width of the above-described first internal electrode unit 17a. Accordingly, the distance is longer than in the first embodiment. Therefore, the distance between the branching waveguide unit 3c and the via part 17b may be longer than in the first embodiment. This makes it possible to increase the degree of concentration of the lines of electric force from the signal electrode 5 on the branching waveguide unit 3c (the electric field component of the crystal z-axis component may be increased) and to increase the electric field application efficiency.

When the first internal electrode unit 17a is formed of metal, the electric conductivity of the electrode is higher than that of the electrode formed of a conductive crystal material. This may reduce the conductor loss. When the conductor loss is reduced, the modulation efficiency is increased. This may reduce the driving voltage.

As described above, the power saving is achieved by reducing the driving voltage in the second embodiment.

Figure 5A:
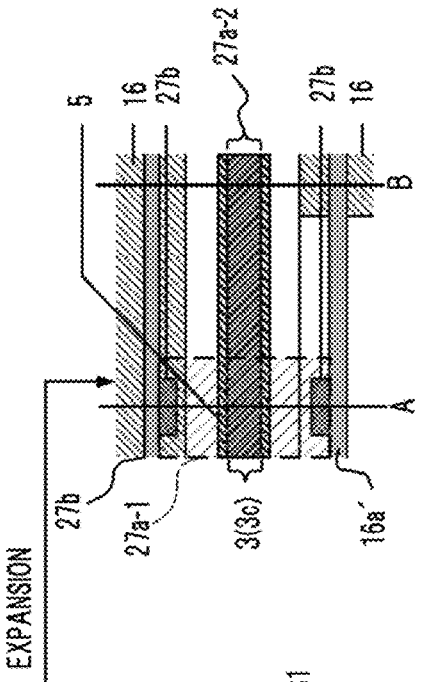
FIG. 5A illustrates a third embodiment.
Figure 5C:
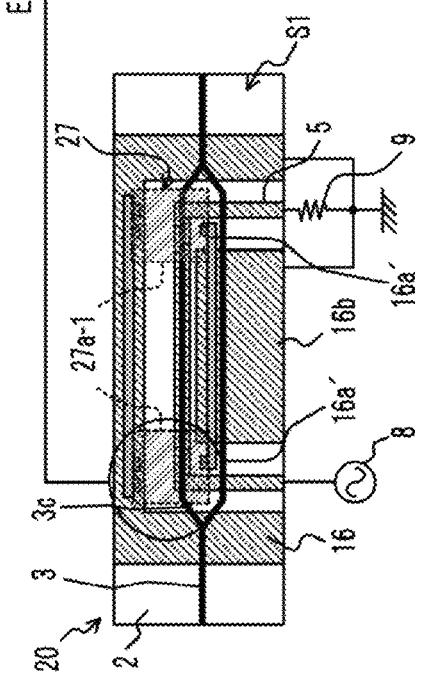
FIG. 5C illustrates a third embodiment.
Figure 5B:
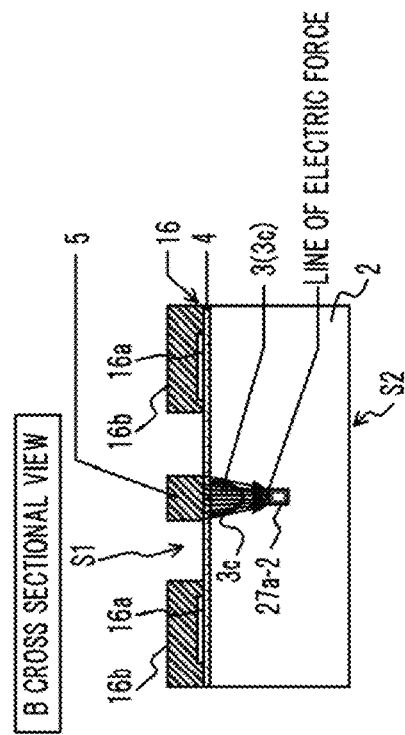
FIG. 5B illustrates a third embodiment.
Figure 5D:
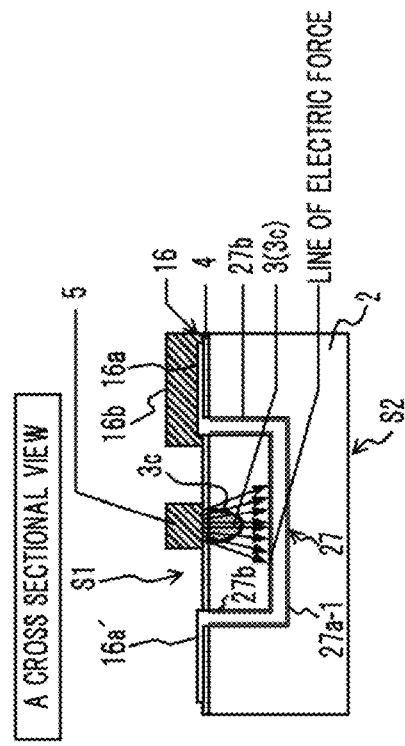
FIG. 5D illustrates a third embodiment.

FIG. 5A through FIG. 5D are diagrams illustrating a third embodiment. In FIG. 5A through FIG. 5D, numeral 20 indicates an optical waveguide device. FIG. 5A is a top view of the optical waveguide device 20. FIG. 5B is an expanded view of a portion of FIG. 5A. FIG. 5C is an A cross sectional view of FIG. 5B. FIG. 5D is a B cross sectional view of FIG. 5B.

The optical waveguide device 20 illustrated in FIG. 5a-FIG. 5D is similar to the optical waveguide device 11 according to the second embodiment in that the optical waveguide device may be used as an optical modulator. However, the in-substrate electrode 27 thereof is different. The same numerals in FIG. 4A through FIG. 4D indicate substantially similar same parts.

The in-substrate electrode 27 includes a first internal electrode unit (27a-1, 27a-2) having a pattern different from that of the in-substrate electrode 17 according to the second embodiment, and includes a via part 27b. The first internal electrode unit (27a-1, 27a-2) has the same width of the end units 27a-1 of the upstream side and the downstream side in the light propagation direction as that of the in-substrate electrode 17 according to the above-described second embodiment. The width of a middle stream unit 27a-2 between the end units 27a-1 is reduced. As for the first internal electrode unit (27a-1, 27a-2), the width of an end unit 27a-1 of the upstream side and the downstream side in the light propagation direction is the same as that of the in-substrate electrode 17 according to the above-described second embodiment. However, the width of a middle stream unit 27a-2 between the end units 27a-1 is reduced. In other words, the first internal electrode unit (27a-1, 27a-2) includes a pattern such that the width of the end positions from the upstream side to the downstream side in the light propagation direction in the branching waveguide unit 3c is larger than the width of other positions.

A plurality of via parts 27b are formed along the both edges of the above-described end unit 27a-1, so that the first internal electrode unit (27a-1, 27a-2) and the ground electrode 16 are conductive. The distance between the via parts 27b connected to the end unit 27a-1 ranging from the right to the left in the light propagation direction may correspond to the distance of the area facing the ground electrode 16 in the same manner as in the second embodiment. Accordingly, in the same manner as in the second embodiment, it is possible to increase the degree of concentration of the lines of electric force from the signal electrode 5 on the branching waveguide unit 3c (the electric field component of the crystal z-axis component may be increased) and to increase the electric field application efficiency.

When the first internal electrode unit (27a-1, 27a-2) is formed of metal, the electric conductivity of the electrode is higher than that of the electrode formed of a conductive crystal material. This may reduce the conductor loss. When the conductor loss is reduced, the modulation efficiency is increased. This may reduce the driving voltage.

As described above, in the same manner as in the above-described embodiments, the power saving may be achieved by reducing the driving voltage in the third embodiment.

FIG. 6A through FIG. 6D are diagrams illustrating a fourth embodiment. In FIG. 6A through FIG. 6D, numeral 30 indicates an optical waveguide device. FIG. 6A is a top view of the optical waveguide device 30. FIG. 6B is an expanded view of a portion of FIG. 6A. FIG. 6C is an A cross sectional view of FIG. 6B. FIG. 6D is a B cross sectional view of FIG. 6B.

The optical waveguide device 30 illustrated in FIG. 6A through FIG. 6D is similar to the optical waveguide device according to the above-described embodiments in that the optical waveguide device may be used as an optical modulator. However, an in-substrate electrode 37 thereof is different. The same numerals in FIG. 6A through FIG. 6D indicate substantially similar parts.

The in-substrate electrode 37 includes a first internal electrode unit (37a-1, 37a-2) having a pattern different from that of the in-substrate electrode according to the above-described embodiments. The via part 17b thereof is basically the same as in the second embodiment. Compared to the first internal electrode unit 17a according to the second embodiment, the first internal electrode unit (37a-1, 37a-2) according to the fourth embodiment is formed to have a narrower width of a part to which the via part 17b is not connected. In other words, the first internal electrode unit (37a-1, 37a-2) has a comb-like pattern having a trunk part 37a-1 in a lower position of the branching waveguide unit 3c and also has comb-like branch parts 37a-2 ranging from the right to the left in the light propagation direction. According to the present embodiment, as illustrated in FIG. 6A, the comb-like branch parts 37a-2 formed on the ends of the upstream side and the downstream side in the light propagation direction in the first internal electrode unit (37a-1, 37a-2) are formed to be relatively thicker than other comb-like branch parts 37a-2.

The via part (conduction via) 17b as an example of the first connection unit is connected to one of the comb-like branch parts 37a-2 in the first internal electrode unit (37a-1, 37a-2), so that the first internal electrode unit (37a-1, 37a-2) and the ground electrode 16 are connected. As with the second embodiment, a plurality of via parts 17b may be formed to correspond to the comb-like branch parts 37a-2. In this case, as illustrated in FIG. 6C, each of the via parts 17b may be in a shape to be connected at a top of a branch of one of the comb-like branch parts 37a-2.

Therefore, the via part 17b may connect the first internal electrode unit (37a-1, 37a-2) and the ground electrode 16. The distance between the via parts 17b connected to the comb-like branch parts 37a-2 may correspond to the distance of the area facing the ground electrode 16 in the same manner as the second embodiment and the third embodiment. Accordingly, as with the second embodiment and the third embodiment, it is possible to increase the degree of concentration of the lines of electric force from the signal electrode 5 on the branching waveguide unit 3c (the electric field component of the crystal z-axis component may be increased) and to increase the electric field application efficiency.

When the first internal electrode unit (37a-1, 37a-2) is formed of metal, the electric conductivity of the electrode is higher than that of the electrode formed of a conductive crystal material. This may reduce the conductor loss. When the conductor loss is reduced, the modulation efficiency is increased. This may reduce the driving voltage.

As described above, in the same manner as in the above-described embodiments, the power saving may be achieved by reducing the driving voltage in the fourth embodiment.

Figure 7A:
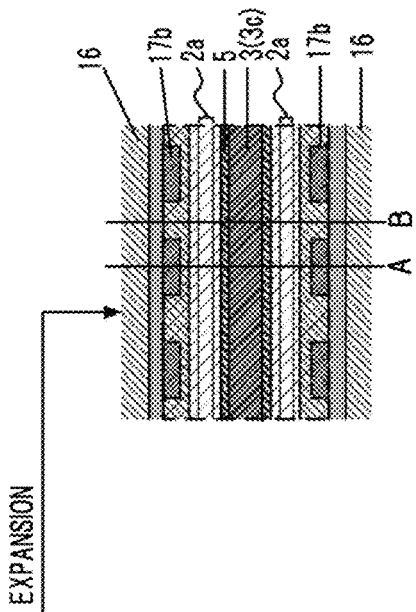
FIG. 7A illustrates a fifth embodiment.
Figure 7B:
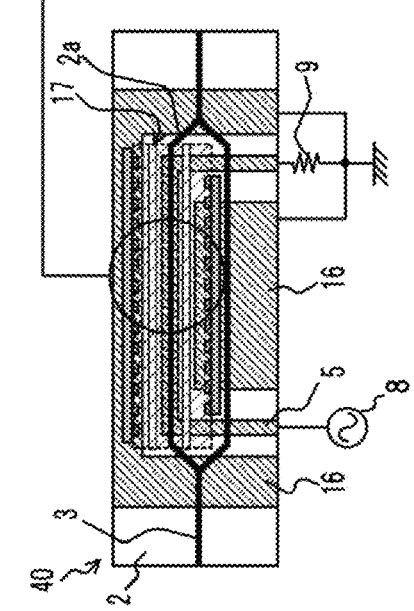
FIG. 7B illustrates a fifth embodiment.
Figure 7C:
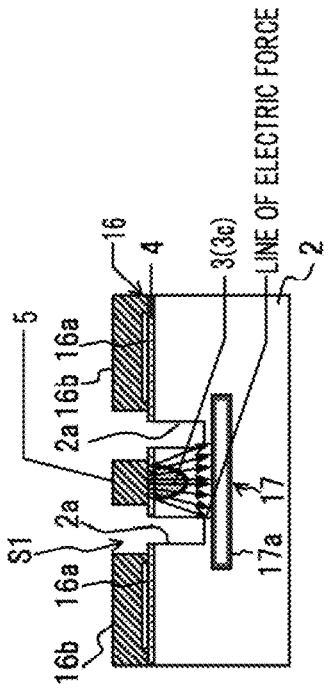
FIG. 7C illustrates a fifth embodiment.
Figure 7D:
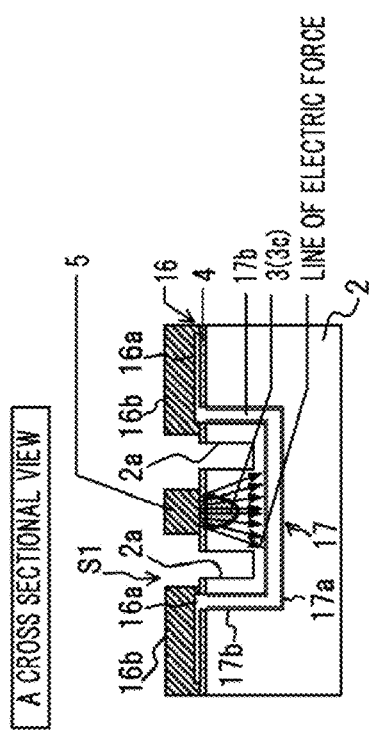
FIG. 7D illustrates a fifth embodiment.

FIG. 7A through FIG. 7D are diagrams illustrating a fifth embodiment. In FIG. 7A through FIG. 7D, numeral 40 indicates an optical waveguide device. FIG. 7A is a top view of the optical waveguide device 40. FIG. 7B is an expanded view of a portion of FIG. 7A. FIG. 7C is an A cross sectional view of FIG. 7B. FIG. 7D is a B cross sectional view of FIG. 7B.

The optical waveguide device 40 illustrated in FIG. 7A through FIG. 7D is similar to the optical waveguide device 11 according to the second embodiment in that the optical waveguide device may be used as an optical modulator. However, the branching waveguide unit 3c of the optical waveguide 3 thereof is used as a ridge waveguide, for example. That is, as illustrated in FIG. 7C and FIG. 7D, for example, a groove 2a is formed on the both sides of the branching waveguide unit 3c, so that the branching waveguide unit 3c is used as a ridge waveguide.

The branching waveguide unit 3c is used as a ridge waveguide. The use of branching waveguide unit 3c as a ridge waveguide makes it possible to increase the degree of concentration of the lines of electric force from the signal electrode 5 on the branching waveguide unit 3c and to increase the electric field application efficiency while promoting light trapping into the optical waveguide 3c.

In the same manner as in the above-described embodiments, the power saving may be achieved by reducing the driving voltage in the fifth embodiment.

The fifth embodiment has a configuration in which the optical waveguide 3c of the optical waveguide device 11 according to the second embodiment includes the ridge waveguide. The fifth embodiment may also have a configuration in which the optical waveguide 3 according to other embodiments includes the ridge waveguide.

Figure 8B:
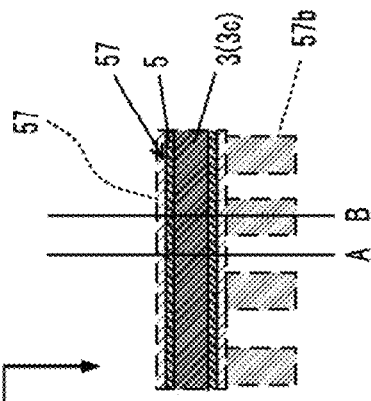
FIG. 8B illustrates a sixth embodiment.
Figure 8D:
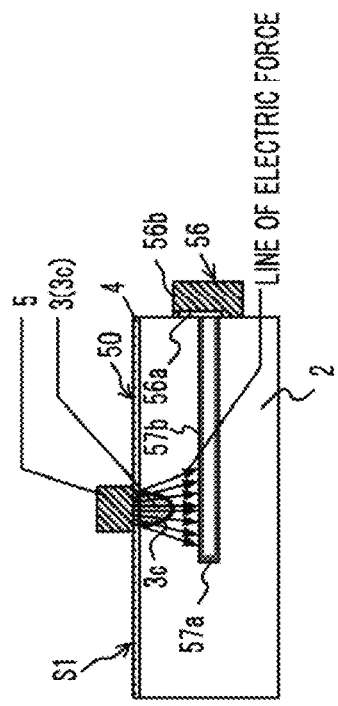
FIG. 8D illustrates a sixth embodiment.
Figure 8A:
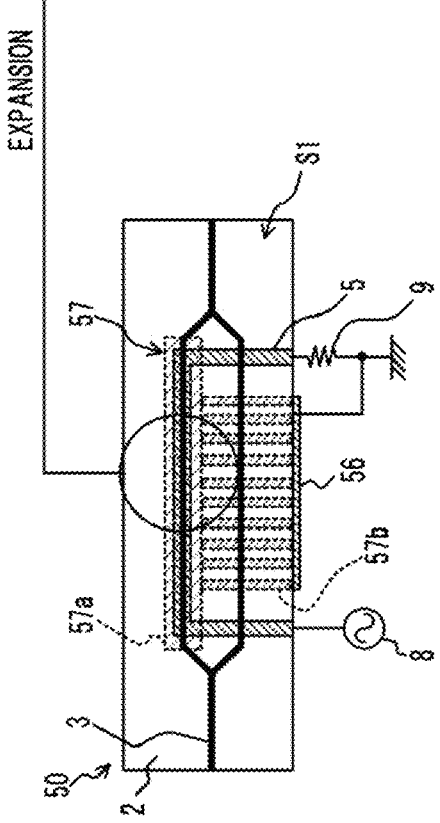
FIG. 8A illustrates a sixth embodiment.
Figure 8C:
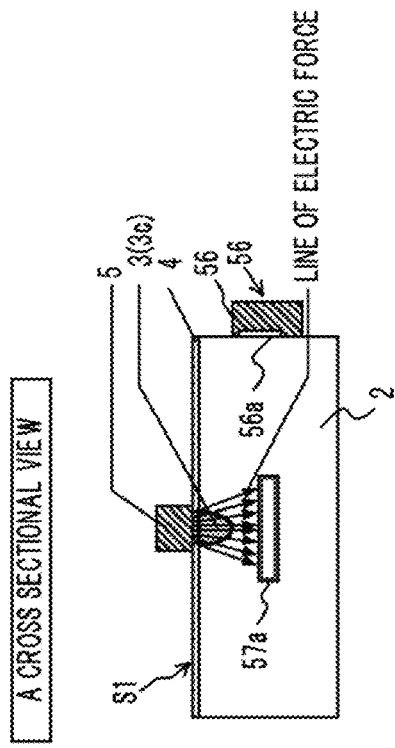
FIG. 8C illustrates a sixth embodiment.

FIG. 8A through FIG. 8D are diagrams illustrating a sixth embodiment. In FIG. 8A through FIG. 8D, numeral 50 indicates an optical waveguide device. FIG. 8A is a top view of the optical waveguide device 50. FIG. 8B is an expanded view of a portion of FIG. 8A. FIG. 8C is an A cross sectional view of FIG. 8B. FIG. 8D is a B cross sectional view of FIG. 8B.

The optical waveguide device 50 according to the ninth embodiment illustrated in FIG. 8A through FIG. 8D is similar to the optical waveguide device according to the above-described embodiments in that the optical waveguide may be used as an optical modulator. However, a ground electrode 56 and an in-substrate electrode 57 thereof are different. The same numerals in FIG. 8A through FIG. 8D indicate substantially similar parts.

Here, the ground electrode 56 is formed on the side surface of the substrate 2. According to the present embodiment, on either one of the longer surfaces along the longitudinal direction of the substrate 2, the ground electrode 56 is formed from the upstream side to the downstream side in the light propagation direction in the branching waveguide unit 3c. The in-substrate electrode 57 includes a second internal electrode unit 57a having a surface area corresponding to a surface to which the signal electrode 5 applies the electric field in the direction vertical (perpendicular) to the first surface S1 of the substrate 2 and includes a plurality of branch parts 57b as an example of a second connection unit that electrically connects the second internal electrode unit 57a and the ground electrode 56.

The plurality of branch parts 57b are formed at intervals in the light propagation direction in the branching waveguide unit 3c and extend from the second internal electrode unit 57a to the side of the substrate 2 where the ground electrode 56 is formed. As illustrated in FIG. 8C, the A cross sectional view in FIG. 8B corresponds to the cross sectional view in which the branch part 57b is not formed. The B cross sectional view in FIG. 8B corresponds to the cross sectional view in which the branch part 57b is formed as illustrated in FIG. 8D.

In the optical waveguide device 50 configured as described above, the in-substrate electrode 57 forms a cavity in a part where the in-substrate electrode 57 is to be formed (see FIG. 2A through FIG. 2C) in the same manner as in the above-described first embodiment, the formed cavity is filled with metal as the in-substrate electrode 57 (see FIG. 2D and FIG. 2E), and then the electrode 5 is formed on the first surface S1 of the substrate 2, and the electrode 56 is formed on the side surface of the substrate 2.

As illustrated in FIG. 8C and FIG. 8D, when the in-substrate electrode 57 is filled with the metal, a part 56a may be formed as part of the metal, filled in the substrate 2, and exposed on the side surface. The part 56a may be configured as an element of the ground electrode 56. That is, after filling with the metal as described above, the ground electrode 56 may be formed by forming an electrode layer 56b having a pattern covering the part 56a.

In the optical waveguide device 50, the branching waveguide unit 3c is interposed between the second internal electrode unit 57a and the signal electrode 5 that are electrically connected to the ground electrode 56.

Compared to the coplanar electrode structure, among the lines of electric force generated by the potential difference given to the signal electrode 5 and the first internal electrode unit 57a, the lines of electric force going through the branching waveguide unit 3c in the direction vertical (perpendicular) to the first surface S1 may be concentrated. In other words, the number of lines of electric force going through in the vertical (perpendicular) direction may be increased. This may improve the application efficiency of the driving voltage. The improvement of the application efficiency of the driving voltage may reduce the power required to generate a desired change in the refractive index.

When the first internal electrode unit 57a is formed of the metal, the electric conductivity of the electrode is higher than that of the electrode formed of a conductive crystal material. This may reduce the conductor loss. If the conductor loss is reduced, the modulation efficiency is increased. This may reduce the driving voltage.

In the same manners as in the above-described embodiments, the power saving may be achieved by reducing the driving voltage in the sixth embodiment.

FIG. 9A through FIG. 9D are diagrams illustrating a seventh embodiment. In FIG. 9A through FIG. 9D, numeral 60 indicates an optical waveguide device. FIG. 9A is a top view of the optical waveguide device 60. FIG. 9B is an expanded view of a portion of FIG. 9A. FIG. 9C is an A cross sectional view of FIG. 9B. FIG. 9D is a B cross sectional view of FIG. 9B.

The optical waveguide device 60 illustrated in FIG. 9A through FIG. 9D is similar to the optical waveguide device 50 according to the above-described sixth embodiment in that the optical waveguide device may be used as an optical modulator. However, the in-substrate electrode 67 of the optical waveguide device 60 is different from the in-substrate electrode 57 of the sixth embodiment. The same numerals in FIG. 9A through FIG. 9D indicate substantially similar parts.

Here, the in-substrate electrode 67 includes a second internal electrode unit 67a having a surface area corresponding to a surface to which the signal electrode 5 applies the electric field in the vertical (perpendicular) direction to the first surface S1 of the substrate 2, and also includes an electrode unit 67b as an example of the second connection unit used to electrically connect the second internal electrode unit 67a and the ground electrode 56.

The extended electrode unit 67b, an extended area formed as a part of the in-substrate electrode 67 when the second internal electrode unit 67a is formed, is formed to extend to the side part where the ground electrode 56 is formed from the second internal electrode unit 67a in a part from the upstream side to the downstream side in the light propagation direction in the branching waveguide unit 3c.

A seventh embodiment also includes the in-substrate electrode 67 formed of the metal provided inside the substrate 2. Therefore, as with the cases of the above-described embodiments, the power saving may be achieved by reducing the driving voltage.

Figure 10:
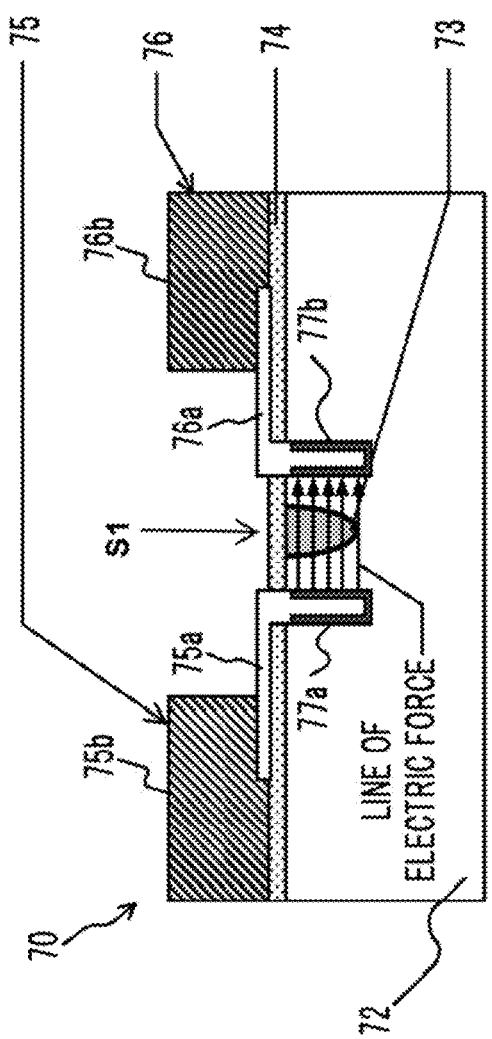
FIG. 10 illustrates an eighth embodiment.

FIG. 10 is a cross sectional view of an optical waveguide device 70 according to an eighth embodiment. The optical waveguide device 70 includes a substrate 72, an optical waveguide 73, electrodes 75 and 76, and in-substrate electrodes 77a and 77b. The substrate 72 is formed of LN, which is an example of the electro-optic crystal. Unlike the above-described embodiments, the electric field change in the direction horizontal (parallel) to the first surface S1 causes a change in the refractive index of the optical waveguide 73. Specifically, an X-cut LN substrate 72 may be used.

The optical waveguide 73 is provided on the first surface S1 of the substrate 72. For example, the pattern of the Mach-Zehnder interferometer may be used in the same manner as in the above-described embodiments. In this case, the optical waveguide device 70 may be used in the same manner as in the above-described embodiments. The pattern of the optical waveguide 73 is an example. Any other pattern may be used.

The electrodes 75 and 76 are formed on the top of the first surface S1 of the substrate 72 to operate with respect to the optical waveguide 73. For example, the electrode 75 may be a signal electrode, and the electrode 76 may be a ground electrode (GND). In this case, the electrodes 75 and 76 are formed across the upper part of the optical waveguide 73.

The electrode 75 includes a second electrode unit 75b as a metal layer and a first electrode unit 75a connected to the second electrode unit 75b. The first electrode unit 75a is used to connect an in-substrate electrode 77a and the second electrode unit 75b composing the electrode 75. As with the above-described first electrode unit 6a illustrated in FIG. 2, the first electrode unit 75a may be formed to be combined with the in-substrate electrode 77a described below.

In the same manner, the electrode 76 includes a second electrode unit 76b as a metal layer and a first electrode unit 76a connected to the second electrode unit 76b. The first electrode unit 76a is formed to be connected to the in-substrate electrode 77b and the second electrode unit 76b composing the electrode 76. As with the first electrode unit 6a illustrated in FIG. 2, the first electrode unit 76a may be formed to be combined with the in-substrate electrode 77b.

Numeral 74 indicates a buffer layer that is layered between the substrate 72 and the electrodes 75 and 76.

The in-substrate electrodes 77a and 77b are formed of metal, for example, copper. According to the example illustrated in FIG. 2, a cavity is formed inside the substrate 72 that is to be the in-substrate electrodes 77a and 77b, and the formed cavity is filled with metal material (for example, copper or the like).

By forming the part of the metal exposed on the side surface of the substrate 72 at the same time when the in-substrate electrodes 77a and 77b are formed by filling the metal, e, the part may be formed as the first electrode units 76a and 76b.

Accordingly, the in-substrate electrodes 77a and 77b may be connected to the electrodes 75 and 76, respectively. When the electrode 75 is a signal electrode and the electrode 76 is a ground electrode, the voltage from the signal electrode 75 and the ground electrode 76 may be applied to the in-substrate electrodes 77a and 77b, respectively.

When the optical waveguide 73 is a pattern of the Mach-Zehnder interferometer illustrated in the above-described embodiments, the in-substrate electrodes 77a and 77b may be formed at intervals and either of the two branching waveguide units (Numerals 3c and 3d) may be interposed between the in-substrate electrodes 77a and 77b. In this case, the in-substrate electrode 77a may be operated as a traveling wave electrode used to apply the electric field to the branching waveguide unit 3c by cooperating with the electrode 75. A high frequency electric signal according to transmission data is supplied from one end of the in-substrate electrode 77a and the other end may be terminated.

The in-substrate electrodes 77a and 77b have a surface arranged in a direction vertical (perpendicular) to the first surface S1 of the substrate 72, are formed to face each other, and the optical waveguide 73 is interposed between the in-substrate electrodes 77a and 77b. In other words, the in-substrate electrodes 77a and 77b are an example of a pair of third internal electrode units. Accordingly, the optical waveguide 73 interposed by the in-substrate electrodes 77a and 77b may generate a line of electric force in the direction horizontal (parallel) to the substrate 72 according to the voltage applied between the in-substrate electrodes 77a and 77b.

For example, compared to the electrode structure that has the signal electrodes 75 and 76 without having the in-substrate electrodes 77a and 77b, the signal electrode 75 and the ground electrode 76 are formed on the top of the substrate 72, so that the line of electric force is generated between the surfaces parallel to the first surface S1 by the voltage application. Therefore, compared to the case of forming the in-substrate electrodes 77a and 77b having the surface in the direction vertical (perpendicular) to the first surface S1 of the substrate 72 and facing each other, the generated intensity of electric field that is horizontal (parallel) to the first surface S1 of the substrate 72 may be expected to be limited at the same driving voltage.

That is, among the lines of electric force generated by the potential difference given to the electrodes 75 and 76, the lines of electric force going through the optical waveguide 73 in the direction parallel to the first surface S1 may be concentrated by the in-substrates electrodes 77a and 77b. In other words, the number of the lines of electric force going through in the direction horizontal (parallel) to the first surface S1 may be increased. This may be increase the application efficiency of the driving voltage. By increasing the application efficiency of the driving voltage, the power required to generate a desired change in the refractive index may be reduced.

The first electrode units 75a and 76a according to the present embodiment include parts that are extended and formed above the optical waveguide 73 from the formation areas of the second electrode units 75b and 76b, respectively. Therefore, even if a longer distance is provided between the signal electrode 75 and the ground electrode 76, the distance between the in-substrate 77a and 77b, between with the optical waveguide 73 is interposed, may be narrowed. The extended areas of the first electrode unit 75a and 76a work as bridges to the in-substrate electrodes 77a and 77b corresponding to the electrodes 75 and 76.

If the in-substrate electrodes 77a and 77b are formed of metal, the electric conductivity of the electrode is higher than that of the electrode formed of a conductive crystal material. This may reduce the conductor loss. When the conductor loss is reduced, the modulation efficiency is increased. This may reduce the driving voltage.

In the same manner as in the above-described embodiments, the power saving may be achieved by reducing the driving power in the eighth embodiment.

Figure 11:
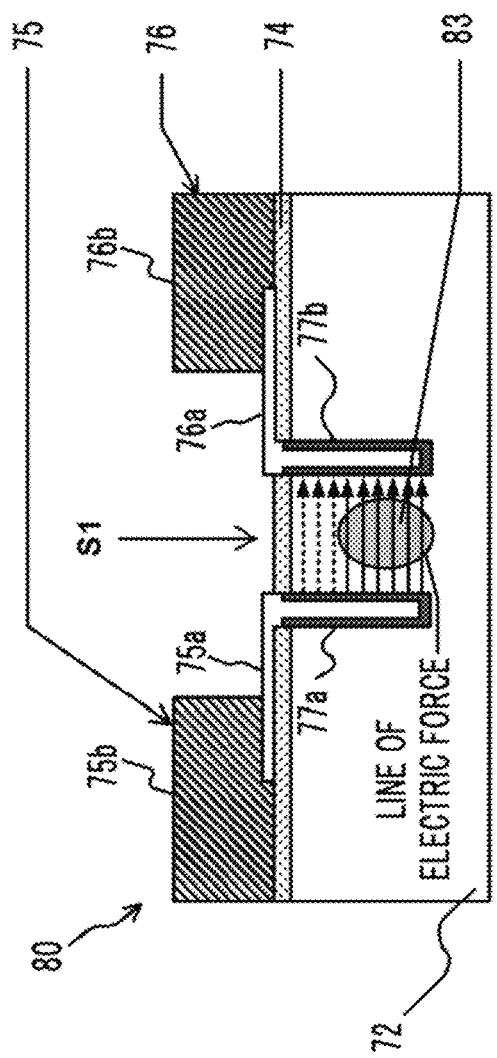
FIG. 11 illustrates a ninth embodiment.

FIG. 11 is a cross sectional view of an optical waveguide device 80 according to the ninth embodiment. The optical waveguide device 80 according to the ninth embodiment is basically the same as the optical waveguide device 70 of the eighth embodiment except that the optical waveguide 83 thereof is formed inside the substrate 72. In FIG. 11, the same numerals as in FIG. 10 indicate the substantially similar parts.

The size of a surface vertical (perpendicular) to the first surface S1 in the in-substrate electrodes 77a and 77b of the optical waveguide device 80 may be specified to be large enough to make the line of electric force, horizontal (parallel) to the first surface S1, go through the optical waveguide 83 formed inside the substrate 72. Therefore, as for the in-substrate electrodes 77a and 77b illustrated in FIG. 11, cavities are formed from the first surface S1 to be deeper than in the case of FIG. 10, and the formed cavities may be filled with metal.

In the same manner as the above-described eighth embodiment, the power saving is achieved by reducing the driving voltage in the ninth embodiment.

FIG. 12 is a cross sectional view of an optical waveguide device 90 according to the tenth embodiment. The optical waveguide device 90 according to the tenth embodiment corresponds to a modification of the optical waveguide device 80 according to the ninth embodiment.

That is, the optical waveguide device 90 includes electrodes 95 and 96 that are different from those in the optical waveguide device 80 illustrated in FIG. 11 and also includes the in-substrate electrodes 97a and 97b.

Here, the electrodes 95 and 96 may be used as, for example, a signal electrode and a ground electrode, respectively. The electrodes 95 and 96 includes first electrode units 95a and 96a that may be formed when the in-substrate electrodes 97a and 97b are formed, and also includes second electrode units 95b and 96b that are connected to the first electrode units 95a and 96a. The first electrode units 95a and 96a are covered with the second electrode units 95b and 96b, respectively. The pattern of the electrodes 95 and 96 is changeable accordingly.

The in-substrate electrodes 97a and 97b have a pattern different from that of the in-substrate electrodes 77a and 77b according to an eleventh embodiment. Specifically, the in-substrate electrodes 97a and 97b include the third internal electrode units 97a-1 and 97b-1 and the connection units 97a-2 and 97b-2, respectively. The third internal electrode units 97a-1 and 97b-1 are formed in a pair facing each other and have surfaces in the direction vertical (perpendicular) to the first surface 51 of the substrate 72. The optical waveguide 83 is interposed between the third internal electrode units 97a-1 and 97b-1.

The connection unit 97a-2 and the third internal electrode unit 97a-1 are formed of metal to be combined with the first electrode unit 95a composing the electrode 95. Accordingly, the third internal electrode unit 97a-1 is connected to the electrode 95 via the first electrode unit 95a of the electrode 95. In the same manner, the connection unit 97b-2 and the third internal electrode unit 97b-1 are formed of metal to be combined with the first electrode unit 96a composing the electrode 96. Accordingly, the third internal electrode unit 97b-1 is connected to the electrode 96 via the first electrode unit 96a.

The first electrode units 95a and 96a illustrated in FIG. 11 are covered with the second electrode units 95b and 96b. Unlike the numerals 75a and 76a in FIG. 10, the extended areas are not included. In FIG. 12, however, the first electrode units 95a and 96a are connected to the connection units 97a-2 and 97b-2. Even when the distance between the electrodes 95 and 96 is relatively longer, the distance between the third internal electrode units 97a-1 and 97b-1 may be narrowed as a pair.

That is, among the lines of electric force generated by the potential difference given between the electrodes 95 and 96, the lines of electric force going through in the direction horizontal (parallel) to the first surface S1 may be concentrated. In other words, the number of the lines of electric force going through in the direction horizontal (parallel) to the first surface S1 may be increased. This may increase the application efficiency of the driving voltage. By increasing the application efficiency of the driving voltage, the power required to generate a desired change in the refractive index may be reduced.

In the same manner as in the above-described seventh embodiment and the eighth embodiment, the power saving is achieved by reducing the driving voltage in the tenth embodiment.

The connection units 97a-2 and 97b-2 are formed in an L-shape as illustrated in FIG. 12. The connection units 97a-2 and 97b-2 may be formed in any shape. The shape of the connection unit 97b-2 along the longitudinal direction of the optical waveguide 83 may be formed accordingly. For example, the shape may be formed in a continuous shape or a comb-like shape.

Regardless of the above-described embodiments, the various changes, substitutions, and alterations could be made hereto without departing from the spirit and scope of the invention.

For example, in the first to sevenths embodiments, the optical waveguide 3 may be formed inside the substrate 2. The via parts 7b, 17b, and 27b are formed in the direction vertical (perpendicular) to the first surface S1 or may be formed in the direction oblique to the first surface S1.

In the above-described embodiments, an optical waveguide may be provided on both the first surface S1 of the substrate 2 and inside the substrate 2. For example, when a three-dimensional intersecting waveguide or the like is formed, the optical waveguides are provided both on the first surface S1 and inside the substrate 2. In this case, the in-substrate electrode may be formed accordingly to apply the voltage to the waveguide inside the substrate and/or the waveguide on the substrate surface.

In the eighth to tenth embodiments, according to the sixth and seventh embodiments, the electrodes 75 and 95 as signal electrodes and the electrodes 76 and 96 as ground electrodes may be formed on different substrates.

As described above, the substrate 2 includes the optical waveguide devices 1, 11, 20, 30, 40, 50, 60, 70, 80, and 90 that are used as an optical modulator. The optical waveguide devices may be used as various optical modulators.

For example, a polarization mode dispersion compensator or a polarization scrambler described in the document for reference ("8 Channel LiNbO_3 Polarization Controllers and Variable Differential Group Delay for PMD Compensation," Doi Masaharu et al, the IEICE General Conference 2008) and the disclosed optical waveguide device may be used. Furthermore, an optical switch described in the document for reference ("Low-crosstalk operation of LiNbO_3 optical switch having sub Mach-Zehnder structures," Chiba Akito et al, the Society Conference of IEICE 2006) and the disclosed optical waveguide device may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method comprising:
    forming an optical waveguide on a substrate and/or inside the substrate, the substrate having an electro-optical effect;
    forming an in-substrate electrode of metal inside the substrate;
    arranging a signal electrode over the optical waveguide; and
    arranging a ground electrode over a first surface of the substrate and separated by a distance from the signal electrode;
    forming a via hole; and
    creating a connection between the ground electrode and the in-substrate electrode through a via-hole provided in the substrate.

2. The method according to claim 1, the method further comprising:
    condensing and radiating an ultrashort pulse laser onto a part of the substrate where the in-substrate electrode is to be formed, and selective etching after the part is amorphized or performing ablation on the part.

3. The method according to claim 1, wherein forming the in-substrate electrode includes
    forming a cavity within the substrate; and
    filling the cavity with the metal to form the in-substrate electrode.

* * * * *